United States Patent [19]
Look

[11] Patent Number: 4,491,923
[45] Date of Patent: Jan. 1, 1985

[54] METHOD AND APPARATUS FOR EXTRACTING INFORMATION FROM AN OBJECT THAT IS WITHIN A LARGE INTERROGATION ZONE

[75] Inventor: Thomas F. Look, Ham Lake, Minn.

[73] Assignee: Minnesota Mining and Manufacturing Company, St. Paul, Minn.

[21] Appl. No.: 347,240

[22] Filed: Feb. 9, 1982

Related U.S. Application Data

[63] Continuation-in-part of Ser. No. 249,180, Mar. 30, 1981, abandoned.

[51] Int. Cl.³ .............................................. H04N 7/00
[52] U.S. Cl. .................................... 364/478; 364/565; 364/525; 356/5; 356/28; 358/93
[58] Field of Search ............... 364/478, 468, 385, 518, 364/565, 525; 356/5, 28; 358/93; 340/146.3

[56] References Cited

U.S. PATENT DOCUMENTS

| | | |
|---|---|---|
| 3,118,139 | 1/1964 | Durstewitz . |
| 3,122,740 | 2/1964 | Kruse et al. . |
| 3,164,725 | 1/1964 | Straub . |
| 3,181,150 | 4/1964 | Ruppersberg et al. . |
| 3,373,441 | 3/1968 | Zadig . |
| 3,604,805 | 9/1971 | Scott . |
| 3,679,828 | 7/1972 | Becky . |
| 3,804,518 | 4/1974 | Meyr ........................... 364/565 X |
| 3,824,015 | 7/1974 | Petit et al. .................. 364/565 X |
| 3,846,753 | 11/1974 | Spanjersberg . |
| 3,847,346 | 11/1974 | Dolch . |
| 3,982,101 | 9/1976 | Kalb et al. ........................ 364/565 |
| 4,001,780 | 1/1977 | Kikukawa et al. . |
| 4,085,314 | 4/1978 | Schultz et al. . |
| 4,166,673 | 9/1979 | Dona . |
| 4,181,432 | 1/1980 | Flower ........................... 364/565 X |
| 4,198,125 | 4/1980 | Tatian et al. ................... 364/565 X |
| 4,281,342 | 7/1981 | Ueda et al. . |
| 4,332,012 | 5/1982 | Sekine et al. . |
| 4,356,489 | 10/1982 | Hirota et al. .................. 364/565 X |

Primary Examiner—Edward J. Wise
Attorney, Agent, or Firm—Donald M. Sell; James A. Smith; William D. Bauer

[57] ABSTRACT

A method and apparatus for extracting information from an object within a large interrogation zone by utilizing a retroreflective backing to define the location of the object and/or information on the object, and an apparatus designed to eliminate from consideration all specularly and diffusely reflected light otherwise present within the zone and thereby isolate the retroreflective backing within the zone. The apparatus then extracts the information which was defined by the retroreflective backing.

15 Claims, 3 Drawing Figures

METHOD AND APPARATUS FOR EXTRACTING INFORMATION FROM AN OBJECT THAT IS WITHIN A LARGE INTERROGATION ZONE

CROSS REFERENCE TO RELATED APPLICATION

This application is a continuation-in-part of applicant's copending U.S. patent application Ser. No. 249,180, filed Mar. 30, 1981 now abandoned.

BACKGROUND OF THE INVENTION

This invention relates to a method and an apparatus for machine extracting information from an object that is within a relatively large inspection or interrogation zone.

There are numerous circumstances in which it is desirable to identify information about an object while that object is within or passes through an inspection field or zone. The information can be either affixed to the object such as destination tags on luggage, addresses on letters, or descriptive information on the sides of railroad cars, or the information can relate to the object itself, such as the speed and location of a moving vehicle. If the object or the information on the object has a defined location and orientation with respect to the inspection field or zone, it is generally possible to utilize a machine to read and process the information. If, on the other hand the object's or the information's location and/or orientation is undefined, a manual interface is generally required, or some other provision must be made to somehow locate the object or information within the field. This task is made easier if at least the location and the orientation of the object and any information thereon can be controlled so that its location at a given time is known. If control over the object is impossible, it has generally not been feasible to automate a method or apparatus for locating the object and extracting the information therefrom. This is in part due to the memory capacity that is required for storing and processing the total information contained within a large field in order to locate the object and extract the desired information, as well as the relatively large amount of time that would be involved in doing this.

SUMMARY OF THE INVENTION

The present invention is directed to a method and an apparatus for locating the object and/or information, and for extracting the information from the object, as that object passes through, or while that object is within a large interrogation zone, without requiring that the object or the information contained thereon have a defined location and orientation with respect to the zone.

The method according to the present invention comprises affixing or attaching a retroreflective target area to the object, which target area is designed to reflect incident electromagnetic radiation, in a concentrated cone surrounding the axes of incidence. The information which is to be located and/or extracted, if separate from the object itself, can then be incorporated into the retroreflective material. The zone through which the object will pass is irradiated with electromagnetic radiation, by a source having a predetermined location with respect to the zone. The radiation originating from the source, therefore, has a known axis of incidence as it reaches the zone. During the time the zone is being irradiated, it is also sensed for electromagnetic radiation. This is done by sensing means located adjacent the known axis of incidence from the irradiation source. The location of the sensing means near the axis of incidence for the irradiation source tends to limit the radiation received by the sensing means to that which has originated from the irradiation source and been reflected by the retroreflective material. This is because the radiation originating from the source and reflected by areas within the zone not defined by the retroreflective material, or the radiation origination from other sources, tends to be diffusely or specularly reflected away from the sensing means. To further ensure however, that only the radiation which has originated from the source and then been retroreflected by the retroreflective material is ultimately considered, the reflected radiation sensed is divided into a network of individual segments, and a relative location with respect to the zone is determined for each of these segments. The magnitude of electromagnetic radiation present within each of the segments is also measured. Segments consisting of radiation reflected by the retroreflective material generally have a greater magnitude of reflected radiation than those segments made up of light diffusely reflected from other areas within the zone. Therefore, those segments having a magnitude for the electromagnetic radiation above a value which is typical of diffuse reflection can be selected, with the remainder of the segments eliminated from consideration. This tends to further eliminate from consideration areas of the zone not defined by the retroreflective material. Specularly reflected radiation may also be present within the zone, however the occurrence of such specular reflection toward the sensing means is rare and usually not a problem. Even this specular reflection can be eliminated from consideration by determining the configuration formed by the selected (i.e. by their magnitude) segments which are adjacent other selected segments. The configurations formed by the adjacent selected segments is compared to the known configuration of the retroreflective material. When a substantially equivalent configuration is found, it can be considered a target area representing the retroreflective material and denoting the location of the information.

Once the location of the object is found within the zone, it is possible through a variety of techniques to extract the desired information from the object or from the retroreflective material incorporated on the object. In the former case standard techniques can be utilized to process the radiation passing from the source to the object, and eventually to the sensing means. In the latter case the information is typically extracted from the retroreflective material by looking for configurations of adjacent selected segments having essentially the same magnitude and comparing these equal magnitude configurations to a plurality of stored configurations, having known identities and representing, for example, the various letters of the alphabet. The equal magnitude configurations representing the information can thereby be identified based upon their substantial equivalence to the stored configurations.

BRIEF DESCRIPTION OF THE DRAWING

The invention will be further described hereinafter with reference to the accompanying figures wherein like numbers refer to like parts in the separate views and wherein.

DETAILED DESCRIPTION OF THE PREFERRED EMBODIMENT

Figure 1:
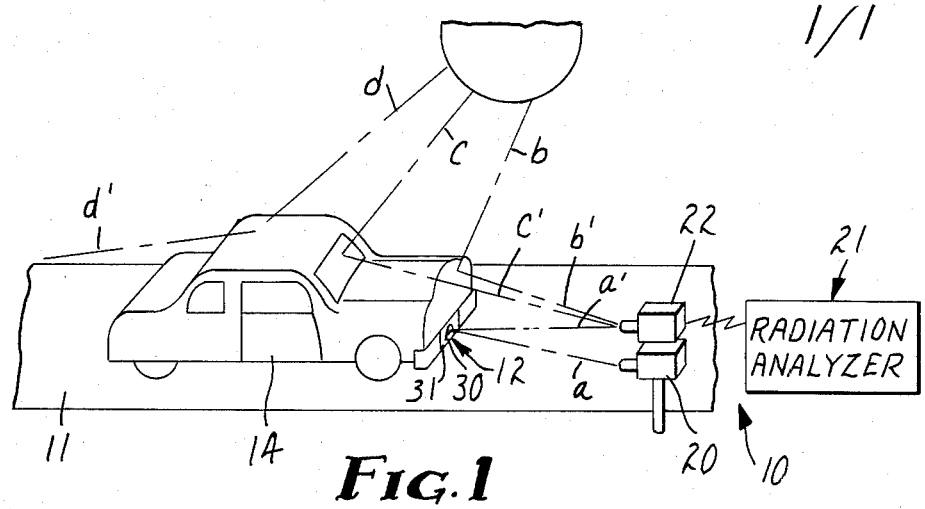
FIG. 1 is a pictorial representation of the method and apparatus according to the present invention.

The apparatus 10 according to the present invention is illustrated in FIG. 1 as it applies to one particular field of use. As will become apparent, the technology disclosed herein has utility in other fields than that shown. Therefore, this illustration is not to be considered limiting. As is illustrated, the apparatus 10 is utilized for sensing and identifying information contained on a license plate 12 of a vehicle 14. This vehicle 14 is typically being driven anywhere from zero to 70 miles per hour within a lane of traffic. Considering the speed of the vehicle and the possibility of interference by other vehicles, the importance of having a system which can identify the information within a minimum response time can be appreciated. It is also apparent that the location and orientation of the license plate 12 upon the vehicle 14 as well as the location of the vehicle 14 within the lane 11 is quite variable. Hence, the location and orientation of the object and the information contained thereon is undefined and must therefore be located before any information can be extracted. The object is located through the use of a sheet of retroreflective material 15 as a type of target to identify the object and thereby allow the apparatus of the present invention to zero in on the information as the vehicle 14 passes through, or is stopped within an interrogation zone formed within a predetermined length or distance of the traffic lane or road. Since retroreflective material 15 is already commonly utilized in the manufacture of license plates 12, the adaptability of the present invention in this particular field is greatly facilitated.

Figure 2:
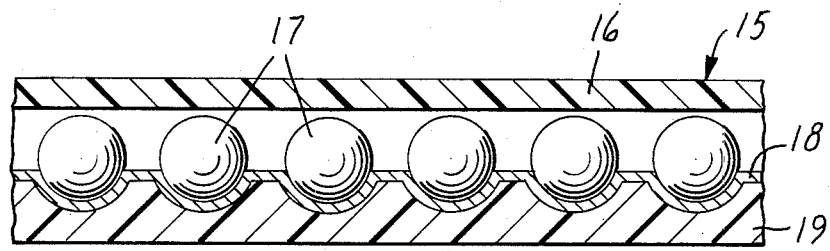
FIG. 2 is an enlarged fragmentary sectional view of retroreflective material used in the method according to FIG. 1.

For an understanding of how the method of the present invention is accomplished, reference is made to FIG. 2 wherein a section of retroreflective material is illustrated. Reflex reflection or retroreflection is a well-known concept which refers to the ability of a material to return a large percentage of the incident radiation back toward its source even though the incident rays have struck the material at an angle other than 90 degrees. The angular difference between the incident radiation and the retroreflected radiation is therefore quite small. The optimal location therefore, to sense the presence of any retroreflected radiation is at a position adjacent the axis of incidence for the incident radiation. Examples of material capable of retroreflection are described in U.S. Pat. Nos. 2,407,680 and 3,190,178 both of which are assigned to Minnesota Mining and Manufacturing Company. The disclosures of these patents are incorporated herein by reference. Typically a retroreflective material 15 includes a transparent cover film 16, a layer of very small transparent glass beads (for example, microspheres) 17 spaced slightly below the film 16 leaving an air space therebetween, an underlying reflective means 18, and a binder layer 19. The microspheres 17 typically have a refractive index substantially higher than the air, or any other substance with which the protruding portions of the microspheres 17 interface, thus affording the microspheres 17 function as convex lens elements which approximately focus incident radiation on the reflective means 18. The glass beads 17 in combination with the back reflector 18 cause the characteristic retroreflection of the incident radiation passing through the microspheres 17. Depending upon the specific design characteristics of the retroreflective material, the present invention can be made to operate beyond the range of frequencies associated with visible light as well as within the visible light frequency range. Cube corner retroreflective elements instead of, or together with glass microspheres such as taught in U.S. Pat. Nos. 2,310,790 or 4,025,159, may also be used in the retroreflective material.

To further clarify the operation of the present invention retroreflection must be distinguished from the two other types of reflection which are encountered. Specular reflection is the type of reflection typified by reflection from a mirror. With specular reflection the angle of incidence of the radiation with the reflecting surface is equal to, but opposite from the angle of reflection. Hence radiation from a source having a large angle of incidence within respect to the object being irradiated, will have an equally large angle of reflection, and unless the angle of incidence is close to 90°, the specularly reflected radiation is typically directed away from the source. Diffuse reflection, on the other hand, generally occurs when radiation is incident on an irregular surface. With diffuse reflection the incident radiation is reflected more or less equally in all directions.

The present invention utilizes the properties of the retroreflective material 15 to eliminate all areas within the zone from consideration, except the area defined by the retroreflective material 15, i.e. the license plate 12. This is done by placing an irradiation source 20 at a fixed location with respect to the zone. The radiation originating from the source 20 will thus pass toward the zone along a known axis of incidence. The irradiation source 20 emits radiation at a frequency within the known design range of the retroreflective material 15. It is also of a sufficient power to produce retroreflected radiation from the retroreflective material 15 having a magnitude greater than any diffusely reflected radiation originating from the source 20 or other sources and reflected off other areas within the zone not defined by the retroreflective material. It has been found that a source of approximately $1.6 \times 10^6$ candelas is desirable when using a system designed for operation with visible light. Such a source is obtained by utilizing four standard Tungsten/Halogen spot lamps, such as those which are commercially available from Sylvania under the model designation FFN. It is possible to enlarge the interrogation zone through the use of more concentrated light sources such as available coherent light sources. These coherent light sources also offer other advantages. It is also possible to use a strobed source such as a Xenon strobe, in which case, the timing of the strobe can be used to further eliminate from consideration specularly reflected radiation within the zone originating from other sources (for example the sun). This elimination is possible because of the non-repetitive and point source nature of specular reflected radiation as will be discussed.

The radiation reflected (see FIG. 1), off of the objects located within the zone is sensed by means including a detector 22. Typically, this detector 22 is a standard television camera which is located adjacent the axis of incidence 21 for the radiation originating from the irradiation source 20, although faster response time can be achieved with photo-detection cells or similar radiation sensing means. As previously explained, this location optimizes the detection of radiation which has originated from the irradiation source 20 and which is retroreflected toward the detector 22 by the retroreflective material 15 (see e.g. ray a-a'). It is also possible however, that the detector 22 will receive radiation which is specularly and diffusely reflected from other areas within the zone, such as chrome bumpers, curved body parts, or glass windows. Diffusely reflected radiation, exemplified by ray b-b' within FIG. 1, can be distinguished from retroreflected radiation by comparing its magnitude to the predicted or known magnitude of radiation originating from the source 20 and retroreflected by the retroreflective material 15. For example, a typical value for maximum solar illumination is 13,000 foot candles. If this solar illumination is incident on a perfect white diffuse reflector having a surface area of one square foot (e.g., one having a luminous efficiency of 0.3 candle power/foot candle/foot squared), the resulting illuminance will be approximately 4,000 candle power. A typical value for the luminous efficiency of retroreflective material is 50 candle power/foot candle/foot squared. Utilizing a source that produces an illumination of $1.6 \times 10^6$ candelas, and placing the source at a distance of approximately 100 ft from the retroreflective material (also having a surface area of one square foot) results in an illuminance for the reflected ray of approximately 8000 candle power. This value is twice that of the diffusely reflected light from the white diffuse reflector. An even greater difference is observed with radiation diffusely reflected from typical painted vehicle surfaces, or when the radiation diffusely reflected has originated from the irradiation source 20 instead of the sun.

Specular reflection (exemplified by rays c-c' and d-d' within FIG. 1) cannot generally be distinguished by a comparison of its illuminance magnitude, since when specular reflection occurs from a very bright source, it has a comparable magnitude to the retroreflected radiation. However, since the angle of incidence and the angle of reflection for specularly reflected radiation must be the same, there are relatively few locations for a source of the specularly reflected radiation which will result in the radiation being specularly reflected toward the detector 22. Since the vehicle 14 is usually moving, resulting in a continuously changing orientation between the source of the radiation and the specular reflector, any specular reflection actually reaching the detector 22 is of a relatively short duration and generally non-repetitive, and has the appearance of a single ray, e.g. as if its source were a single point. The present invention is able to use these characteristics to eliminate from consideration any specularly reflected radiation within the zone, and thereby isolate the retroreflective material or target area. For this purpose an instrument known as a video analyzer 21, which in the preferred embodiment is the model 2000 video-analyzer, commercially available from OCTEK, INC., of Burlington, Mass., is utilized. This instrument analyzes the image of the reflected radiation sensed by the television camera (detector 22) by first dividing that image into an array or network of segments or picture elements (pixels). A value for the illuminance or magnitude of the reflected radiation present within each of the individual segments or within a representative sampling of the individual segments, is determined. This value, along with a location for each particular segment is stored in a memory associated with the video analyzer 21.

Figure 3:
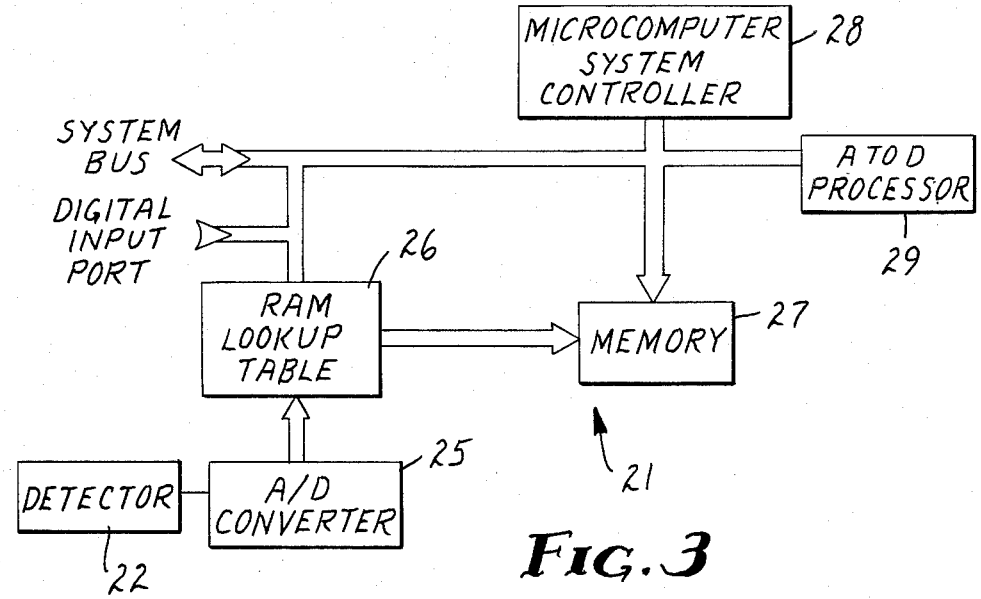
FIG. 3 is a typical block diagram for a video analyzer and associated computer as included by the present invention.

Referring now to FIG. 3, this process can be traced according to a simplified block diagram of the circuitry involved. A television camera or detector 22 is illustrated connected to an analog to digital converter 25. The camera 22 provides a standard video signal to the converter 25 from which the magnitude of illuminance within each of the various picture elements comprising the radiation reflected from objects within the interrogation zone, as well as a reference for the location of each of the picture elements (pixels) can be determined. The converter 25 assigns a discrete value for the magnitude of the illuminance within each of these pixels, and a discrete location code for that pixel. These values are applied to a high speed random access memory (RAM) lookup table 26 which associates the respective location code with the magnitude value for that pixel. This matched or associated information is then stored within a memory 27. The OCTEK system is designed to be utilized with a microcomputer 28 which can access both the memory 27 and the RAM lookup table 26. Once the information is stored within the memory 27, it is possible with the aid of the computer 28 to further process the information by selecting segments of the zone having a magnitude for the electromagnetic radiation which is above a predetermined value, typically the saturation level of the camera. This level is however adjustable by varying the camera's optics, and a value can be chosen which is greater than the typical magnitude for any diffusely reflected radiation which is present. The computer 28 searches the memory 27 for selected segments which by referring to the location codes, are adjacent other selected segments These groups of adjacent selected segments are the target area(s) within the zone which will be further considered. All other segments and accordingly areas within the zone are eliminated from consideration as containing radiation which has been diffusely reflected from non-target, non-retroreflective defined areas. In practice the target areas which remain in the memory 27 therefore consist of radiation retroreflected from those areas of the zone defined by the retroreflective material 15.

The present invention provides an additional assurance however that any specularly reflected radiation will also be eliminated from consideration. This is done by further manipulating the data stored within the memory 27 to determined the configurations which are formed by the adjacent selected segments making up the target areas. The shapes of these formed configurations are compared to the expected shape of a license plate 14. This is done in the preferred embodiment by measuring a dimension such as the length, or a ratio of two dimensions, of the formed configurations with the comparable known dimension, or ratio of two dimensions, for the license plate 14. Those formed configurations for which this comparison does not result in substantial equality are rejected as being made up of radiation from other sources than that retroreflected by the retroreflective license plate. Those formed configurations wherein the comparison results in substantial equality are thus selected as representing the license plate and further processed to identify the information contained therein. It is also possible to eliminate specularly reflected radiation originating from other sources by sensing the zone for radiation at a time when the source 20 is energized and also at a time which the source 20 is de-energized. If this is done instantaneously, the specular reflection of radiation from other sources would be present in both cases, while the radiation from the source 20 is only present in the former case. Hence the reflected radiation sensed in both cases can be subtracted by the computer 28, leaving only the radiation due to the source 20 which is typically retroreflected radiation. In this manner a single license plate, as defined by the retroreflective material, can be located within the large field in a minimal amount of time, and with a minimal amount of processing.

Once the license plate is located, the apparatus can also be used to determine such information as the speed of the vehicle bearing the license plate. There are multiple techniques by which the speed can be calculated once an original location for the vehicle has been determined and identified. For example, the Doppler phase shift occurring between the source radiation and the retroreflected radiation can be measured and used to determine the speed of the vehicle. Although other radar systems use the Doppler effect, the present invention has the advantage of being used with visable or near visable radiation (i.e. ultra-violet, visible light, infra-red). Due to the omnipresence of this radiation in the environment, it is virtually impossible to design a detector that would be able to alert a speeding driver of a vehicle whose speed is being measured, in an adequate time for the driver to decrease speed, and thus escape detection. These routines can be proformed by conventional analog and digital circuitry 29, on the signal from the sensor 22, and controlled by the microcomputer 28.

Other methods of calculating the speed of the object are also available with the present invention. For example the time taken for the radiation to travel from the source to the retroreflector and back to the sensor, can be determined. Since the speed of the radiation is known, the distance between the retroreflector and the source can be determined by multiplying the speed of the radiation to complete the trip between the source and the sensor. This same determination can be made at some pre-determined later time. The first distance is then substracted from the second distance, with this change in distance divided by the pre-determined time between the measurements. The resultant quotient is equivalent to the speed of the vehicle. All of these measurements and calculations can be made in less than 1 second. Alternatively, the intensity of the radiation from the source and the intensity of the radiation returning to the sensor from the retroreflective material can be determined. The resulting reduction in the intensity of the radiation can be compared to the predicted relationship between the intensity of the radiation and the distance travelled by the radiation. These calculations again determine the distance of the retroreflective material from the source. If these calculations are repeated after a pre-determined delay, with the change in distance divided by the delay in time between the measurements, the speed of the vehicle is determined. In all of the methods described above the determinations made can be repeated a number of times and then averaged to ensure accuracy in the determined speed of the vehicle.

In the case of license plates there is also information contained therein, i.e. the desired alphabetic and numeric characteris, which is usually embossed in the retroreflective material and otherwise defined by printing with contrasting inks. Other standard techniques are also useable for incorporating the information into the license plates. In the preferred embodiment identification of the information contained within the license plate or target area can be extracted by a standard character recognition technique known as "template matching." Other techniques are also available, however, and may work equally well. With the template matching technique, the formed configurations consisting of adjacent picture elements or segments isolated by the method described above, are further manipulated to look for configurations of adjacent segments which have an approximately equal magnitude. These equal magnitude formed configurations are compared by the computer 28 to a plurality of configurations stored in the computer memory 27 having known identities based upon the known relationship between the magnitude and location of the elements from which they are composed. For this reason, this technique has been given the name "template matching." The configurations which are determined equivalent to the known configurations are identified based upon the adoption of the identity of the known configurations. For example, each of the standard alphabetic and numeric characters can be described numerically by dividing their configuration into incremental elements or segments and associating a magnitude value (e.g., grey-scale value) and a location value for each of these incremental elements. It is this matrix of numbers which is stored in the memory 27 as the known configuration for each of the characters. Typically, a license plate 12 contains some combination of alphabetic and numeric characters 30, accentuated by a contrasting color from the background 31 of the plate 12. The contrasting color will result in a difference in the magnitude of retroreflected radiation sensed as reflected from the various areas the license plate 12 due to a partial or full blockage of the retroreflected material 15 by the ink causing the contrasting colors. Each of the given characters 30 therefore will reflect radiation with all the segments therein having an approximately equal magnitude. Similarly the spaces between the characters and the voids within the character 30 themselves will reflect radiation having a different magnitude which generally corresponds to the background 31. Each of the characters 30 can therefore be extracted from the background 31 and its configuration can be compared to the matrix of numbers for the known characters. Based upon this comparison the extracted characters 30 can be identified. Once an identification has been made, standard computer techniques can be used to make a record of all license numbers passing a given point or the license numbers can be compared to table of license plate numbers, e.g., for stolen cars, which is also contained in the computer memory 27.

Having thus described a preferred embodiment of the present invention it will be understood that changes may be made in the size, shape, or configuration of some of the parts without departing from the present invention as described in the appended claims. It will also be understood that instead of a license plate, retroreflective material can be used as a target area denoting such things as the address location on a letter or parcel, or the destination tag on luggage. When this is done, the present invention can be utilized to identify the location or destination for these items.

What is claimed:

1. A method of sensing and identifying of information having an unknown position and orientation within a large interrogation zone, said method comprising:

incorporating the information which is to be read on a retroreflective material designed to reflect incident electromagnetic radiation in a concentrated cone surrounding the axes of incidence;

irradiating the zone with electromagnetic radiation by a source having a predetermined location with respect to the zone, thereby establishing a known axis of incidence for the radiation from the source;

sensing the zone for electromagnetic radiation which is reflected off of objects within the zone;

locating the sensing means adjacent the known axis of incidence from the irradiation source, thus receiving radiation originating from the irradiation source and reflected by the retroreflective material, but tending to eliminate radiation from radiation sources which is specularly reflected by areas within the zone;

selecting sensed radiation that has a magnitude greater than a predetermined value which is typical for diffuse reflection; and identifying information contained within the selected radiation.

2. A method of sensing and identifying of information having an unknown position and orientation within a large interrogation zone, said method comprising:

incorporating the information which is to be read on a retroreflective material designed to reflect incident electromagnetic radiation in a concentrated cone surrounding the axes of incidence;

irradiating the zone with electromagnetic radiation by a source having a predetermined location with respect to the zone, thereby establishing a known axis of incidence for the radiation from the source;

sensing the zone for electromagnetic radiation which is reflected off of objects within the zone;

locating the sensing means adjacent the known axis of incidence from the irradiation source, thus receiving radiation originating from the irradiation source and reflected by the retroreflective material, but tending to eliminate radiation from the radiation source which is specularly reflected by areas within the zone;

dividing the reflected radiation thus sensed into a network of individual segments and identifying a separate location for each segment;

measuring the magnitude of the electromagnetic radiation present within each segment;

selecting only those segments of the zone having a magnitude for the electromagnetic radiation above a predetermined value which value is a typical maximum for diffuse reflection, determining at least one target area consisting of adjacent selected segments, while eliminating from consideration all areas of the zone not within a target area, thereby eliminating from consideration radiation which is reflected from areas within the zone not defined by the retroreflective material;

identifying any information contained within the target area.

3. A method as claimed in claim 1 or 2 wherein said identification comprises:

isolating the configurations formed by adjacent selected segments which have an approximately equal magnitude of electromagnetic radiation;

comparing each of the isolated configurations to a plurality of known configurations having a known identity and consisting of segments having a known relationship between their magnitudes and locations;

selecting only those isolated configurations wherein said comparison reveals a substantial equivalence to the known configurations; and identifying those isloated configurations determined substantially equivalent to the known configurations, based upon the identity of the known configurations.

4. A method as claimed in claim 2 further comprising:

comparing at least one dimension of said target area to a known dimension, and eliminating from consideration all target areas wherein said comparison of dimensions results in substantial inequality.

5. An apparatus for sensing and identifying information having an unknown location and orientation within a large interrogation zone, which information is defined by a retroreflective material designed to reflect incident electromagnetic radiation in a concentrated cone surrounding the axes of incidence, said system comprising:

means for irradiating the zone having a predetermined location with respect to the zone, thereby establishing a known axis of incidence for radiation from the irradiation means to the zone, means for sensing radiation which is reflected off of objects located within the zone, including a detector located adjacent said axis of incidence for said irradiation means and thereby positioned to optimally receive retroreflected radiation from said retroreflective material, means for dividing the radiation sensed into a network of individual segments and for identifying a separate location for each segment, means for measuring the magnitude of the electromagnetic radiation present within each of said segments, means for selecting only those segments of the zone having a magnitude for the electromagnetic radiation sensed above a predetermined value which is typical of diffuse reflection, thereby tending to eliminate radiation which is reflected from areas within the zone not defined by the retroreflective material, means for identifying information included on said retroreflective material.

6. In a device for reading information which is moving through a zone, the improvement comprising a system for locating that information within the zone while eliminating from consideration the remainder of the zone, said system comprising:

means for irradiating the zone having a predetermined location with respect to the zone, thereby establishing a known axis of incidence for the radiation from the irradiation means to the zone, means for sensing radiation which is reflected off of objects located within the zone, including a detector located adjacent said axis of incidence for said irradiation means, a retroreflective material designed to reflect incident electromagnetic radiation within a predetermined frequency range, in a concentrated cone surrounding the axes of incidence, thereby reflecting the radiation from said irradiation means to said detector while reflecting radiation originating from other sources toward the other sources, said retroreflective material including means for incorporating information thereon, means for dividing the radiation sensed into a network of individual segments and for identifying a separate location for each segment, means for measuring the magnitude of the electromagnetic radiation present within each of said segments, means for selecting only those segments of the zone having a magnitude for the electromagnetic radiation sensed above a predetermined value which is typical of diffuse reflection, thereby eliminating radiation which is diffusely reflected from areas within the zone not defined by the retroreflective material.

7. A method of machine sensing and identifying of information having an unknown position and orientation within a large interrogation zone, which information is defined by a retroreflective material designed to reflect incident electromagnetic radiation in a concentrated cone surrounding the axes of incidence, said method comprising:

irradiating the zone with electromagnetic radiation by a source having a predetermined location with respect to the zone, thereby establishing a known axis of incidence for the radiation from the source;

sensing the zone for electromagnetic radiation which is reflected off of objects within the zone;

locating the sensing means adjacent the known axis of incidence from the irradiation source, thus receiving radiation originating from the irradiation source and reflected by the retroreflective material, but tending to eliminate radiation from the radiation source which is specularly reflected by areas within the zone;

dividing the reflected radiation thus sensed into a network of individual segments and identifying a separate location for each segment;

measuring the magnitude of the electromagnetic radiation present within each segment;

selecting only those segments of the zone having a magnitude for the electromagnetic radiation above a predetermined value which value is a typical maximum for diffuse reflection, thus eliminating from consideration diffusely reflected radiation, determining at least one target area consisting of adjacent selected segments, while eliminating from consideration all areas of the zone not within the target area, thereby eliminating from consideration radiation which is reflected from areas within the zone not defined by the retroreflective material;

identifying any information contained within the target area.

8. A method of sensing and identifying an object having an unknown position and orientation within a large interrogation zone and extracting information therefrom, said method comprising:

incorporating on the object a retroreflective material designed to reflect incident electromagnetic radiation in a concentrated cone surrounding the axes of incidence;

irradiating the zone with electromagnetic radiation by a source having a predetermined location with respect to the zone, thereby establishing a known axis of incidence for the radiation from the source;

sensing the zone for electromagnetic radiation which is reflected off of objects within the zone;

locating the sensing means adjacent the known axis of incidence from the irradiation source, thus receiving radiation originating from the irradiation source and reflected by the retroreflective material, but tending to eliminate radiation from radiation sources which is specularly reflected by areas within the zone;

selecting sensed radiation that has a magnitude greater than a predetermined value which is typical for diffuse reflection, thereby locating the retroreflective material; and determining the velocity of the object having the retroreflective material.

9. A method of sensing an object within a large interrogation zone and determining its velocity, said method comprising:

incorporating on the object a retroreflective material designed to reflect incident electromagnetic radiation in a concentrated cone surrounding the axes of incidence;

irradiating the zone with electromagnetic radiation by a source having a predetermined location with respect to the zone, thereby establishing a known axis of incidence for the radiation from the source;

sensing the zone for electromagnetic radiation which is reflected off of objects within the zone;

locating the sensing means adjacent the known axis of incidence from the irradiation source, thus receiving radiation originating from the irradiation source and reflected by the retroreflective material, but tending to eliminate radiation from the radiation source which is specularly reflected by areas within the zone;

dividing the reflected radiation thus sensed into a network of individual segments and identifying a separate location for each segment;

measuring the magnitude of the electromagnetic radiation present within each segment;

selecting only those segments of the zone having a magnitude for the electromagnetic radiation above a predetermined value which value is a typical maximum for diffuse reflection;

determining at least one target area consisting of adjacent selected segments, while eliminating from consideration all areas of the zone not within a target area, thereby eliminating from consideration radiation which is reflected from areas within the zone not defined by the retroreflective material; and determining the velocity of the target area and thereby the velocity of the object containing the target area.

10. A method as claimed in claim 8 or 9 wherein said determination of the velocity comprises:

determining the intensity of the radiation from the source, determining the intensity of the radiation reflected from the retroreflective material, determining the reduction in intensity of the retroreflective radiation compared to the source radiation, comparing said determined radiation in intensity to a predicted relationship between radiation intensity and distance travelled by the radiation thereby determining the distance of the retroreflected material from the source, repeating, after a pre-determined time delay, said determination of the intensity of the radiation from the source and the retroreflective material, said determination of the reduction in intensity, and said comparison of the determined reduction to the predicted relationship between intensity reduction and distance, thereby determining a second distance of the retroreflective material from the source, determining the change between the first and second distance of the retroreflective material from the source, and dividing said determined change by the predetermined delay.

11. A method as claimed in claim 9 wherein said determination of the velocity comprises:

determining the time taken for the radiation to travel from the source to the retroreflective material and then to the sensing means, multiplying said determined time by the known velocity of the radiation, thereby determining the distance between the retroreflective material and the source, repeating said determinations after a pre-determined time delay, and dividing the resulting change in distance by the time delay to determine the speed of the object.

12. A method as claimed in claim 9 further comprising:

comparing at least one dimension of said target area to a known dimension, and eliminating from consideration all target areas wherein said comparison of dimensions results in substantial inequality.

13. An apparatus for sensing object within a large interrogation zone and determining its velocity, which object includes a retroreflective material designed to reflect incident electromagnetic radiation in a concentrated cone surrounding the axes of incidence, said apparatus comprising:

means for irradiating the zone having a predetermined location with respect to the zone, thereby establishing a known axis of incidence for radiation from the irradiation means to the zone, means for sensing radiation which is reflected off of objects located within the zone, including a detector located adjacent said axis of incidence for said irradiation means and thereby positioned to optimally receive retroreflected radiation from said retroreflective material, means for dividing the radiation sensed into a network of individual segments and for identifying a separate location for each segment, means for measuring the magnitude of the electromagnetic radiation present within each of said segments, means for selecting only those segments of the zone having a magnitude for the electromagnetic radiation sensed above a predetermined value which is typical of diffuse reflection, thereby tending to eliminate radiation which is reflected from areas within the zone not defined by the retroreflective material, means for determining the velocity of the object including said retroreflective material.

14. In a device for determining the velocity of an object moving through a zone, the improvement comprising an apparatus to be used in conjunction with means for determining the velocity of an object for locating that object within the zone while eliminating from consideration the remainder of the zone, said apparatus comprising:

means for irradiating the zone having a predetermined location with respect to the zone, thereby establishing a known axis of incidence for the radiation from the irradiation means to the zone, means for sensing radiation which is reflected off of objects located within the zone, including a detector located adjacent said axis of incidence for said irradiation means, a retroreflective material designed to reflect incident electromagnetic radiation within a predetermined frequency range, in a concentrated cone surrounding the axes of incidence, thereby reflecting the radiation from said irradiation means to said detector while reflecting radiation originating from other sources toward the other sources, means for dividing the radiation sensed into a network of individual segments and for identifying a separate location for each segment, means for measuring the magnitude of the electromagnetic radiation present within each of said segments, means for selecting only those segments of the zone having a magnitude for the electromagnetic radiation sensed above a predetermined value which is typical of diffuse reflection, thereby eliminating radiation which is diffusely reflected from areas within the zone not defined by the retroreflective material.

15. A method of machine sensing an object which has an unknown position and orientation within a large interrogation zone and determining its velocity, which object is defined by a retroreflective material designed to reflect incident electromagnetic radiation in a concentrated cone surrounding the axes of incidence, said method comprising:

irradiating the zone with electromagnetic radiation by a source having a predetermined location with respect to the zone, thereby establishing a known axis of incidence for the radiation from the source;

sensing the zone for electromagnetic radiation which is reflected off of objects within the zone;

locating the sensing means adjacent the known axis of incidence from the irradiation source, thus receiving radiation originating from the irradiation source and reflected by the retroreflective material, but tending to eliminate radiation from the radiation source which is specularly reflected by areas within the zone;

dividing the reflected radiation thus sensed into a network of individual segments and identifying a separate location for each segment;

measuring the magnitude of the electromagnetic radiation present within each segment;

selecting only those segments of the zone having a magnitude for the electromagnetic radiation above a predetermined value which value is a typical maximum for diffuse reflection, thus eliminating from consideration diffusely reflected radiation, determining at least one target area consisting of adjacent selected segments, while eliminating from consideration all areas of the zone not within the target area, thereby eliminating from consideration radiation which is reflected from areas within the zone not defined by the retroreflective material;

determining the velocity of the object defined by the retroreflective material.

* * * * *

UNITED STATES PATENT AND TRADEMARK OFFICE
CERTIFICATE OF CORRECTION

PATENT NO. : 4,491,923

DATED : January 1, 1985

INVENTOR(S) : Thomas F. Look

It is certified that error appears in the above-identified patent and that said Letters Patent is hereby corrected as shown below:

Col. 6, line 34, insert a period after segments.
Col. 11, line 50, delete "sensing and identifying" and insert "determining the velocity of"

Signed and Sealed this

Sixteenth Day of July 1985

[SEAL]

Attest:

DONALD J. QUIGG

Attesting Officer   Acting Commissioner of Patents and Trademarks